(12) United States Patent
Tomic et al.

(10) Patent No.: US 8,352,512 B2
(45) Date of Patent: Jan. 8, 2013

(54) XML SCHEMA COLLECTION OBJECTS AND CORRESPONDING SYSTEMS AND METHODS

(75) Inventors: Dragan Tomic, Redmond, WA (US);
Joseph Xavier, Bellevue, WA (US);
Shankar Pal, Redmond, WA (US);
Istvan Cseri, Redmond, WA (US);
Gideon Schaller, Bellevue, WA (US);
Michael Rys, Sammamish, WA (US);
Oliver Nicholas Seeliger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 34 days.

(21) Appl. No.: 12/877,386

(22) Filed: Sep. 8, 2010

(65) Prior Publication Data

US 2010/0332557 A1   Dec. 30, 2010

Related U.S. Application Data

(62) Division of application No. 10/726,080, filed on Dec. 1, 2003, now Pat. No. 7,882,146.

(51) Int. Cl.
*G06F 7/00* (2006.01)
*G06F 17/30* (2006.01)

(52) U.S. Cl. .................. 707/803; 707/809; 707/812

(58) Field of Classification Search .................. 707/803, 707/806, 807, 808, 809, 812
See application file for complete search history.

(56) References Cited

U.S. PATENT DOCUMENTS 6,418,448 B1   7/2002   Sarkar
6,545,682 B1   4/2003   Ventrella et al.
6,996,571 B2 *  2/2006   McConnell ................ 707/999.1
7,047,253 B1 *  5/2006   Murthy et al. ......... 707/999.103
7,096,224 B2 *  8/2006   Murthy et al. ................ 707/763
7,120,645 B2 * 10/2006   Manikutty et al. ..... 707/999.102
7,346,598 B2   3/2008   Arora et al.
7,395,271 B2 *  7/2008   Idicula et al. .......... 707/999.002
7,475,093 B2   1/2009   Tomic et al.
7,882,146 B2   2/2011   Tomic et al.
2003/0144849 A1 * 7/2003   Kakivaya et al. ................. 705/1

(Continued)

FOREIGN PATENT DOCUMENTS

KR   10-2008-0033781   4/2008

OTHER PUBLICATIONS

Garofalakis et al., "XTRACT: A System for Extracting Document Type Descriptors from XML Documents", Sigmod Record, Assoc. Computing Machiner, New York, NY, Jun. 2000, 29(2), 165-176.

(Continued)

*Primary Examiner* — Phong Nguyen
(74) *Attorney, Agent, or Firm* — Woodcock Washburn LLP

(57) ABSTRACT

The present invention provides "XML Schema Collections" and methods and systems for using the same. XML data is typically stored as an XML instance, each of which should conform to a "schema" according to a desired goal. An XML schema provides identification and organization for the data supplied by an XML instance. XML Schema Collections are collections of one or more XML schema namespaces. An storage location designated for storage of XML data, such as an XML column in a relational database, can be "typed" with an XML Schema Collection object, allowing that storage location to store XML instances that conform to more than one XML schema. XML Schema Collections provide increased data storage versatility, and facilitation of data searches.

12 Claims, 10 Drawing Sheets

U.S. PATENT DOCUMENTS

| | | | |
|---|---|---|---|
| 2004/0002939 A1* | 1/2004 | Arora et al. | 707/1 |
| 2004/0006563 A1* | 1/2004 | Zwiegincew et al. | 707/10 |
| 2005/0091231 A1* | 4/2005 | Pal et al. | 707/100 |
| 2006/0143569 A1 | 6/2006 | Kinsella et al. | |
| 2007/0113181 A1 | 5/2007 | Blattner et al. | |
| 2010/0332557 A1* | 12/2010 | Tomic et al. | 707/803 |

OTHER PUBLICATIONS

Garofalakis et al., "XTRACT: Learning Document Type Descripters from XML Document Collections", Data Mining and Knowledge Discovery, Kluwer Academic Publ, Dordrecht, NL, Jan. 2003, 7(1), 23-56.

Kotsakis, "XSD: A Hierarchical Access Method for Indexing XML Schemata", Knowledge and Information Systems, Springer-Verlag, UK, 2002, 4(2), 168-201.

Meier, "eXist: An Open Source Native XML Database", Proceedings of Web, Web-Services, and Database Systms, NODe 2002 Web- and Database-Related Workshops, Erfurt, Germany, Revised Papers (Lecture Notes in Computer Science), Springer-Verlag, Berlin, Germany, Oct. 7-10, 2002, 2593, 169-183.

Yang et al., "Agent Based Data Management in Digital Libraries", Parallel Computing, Elsevier Science BV, Amsterdam, NL, May 2002, 28(5), 773-792.

* cited by examiner

|  | XML Schema1 | Int | Float | XML Schema2 | String |
|---|---|---|---|---|---|
|  | Column 1 | Column 2 | Column 3 | Column 4 | Column 5 |
| Row 1 | XML Instance 1 | 1 | 0.1746 | XML Instance a | "storage" |
| Row 2 | XML Instance 2 | 7 | 0.23232 | XML Instance b | "of" |
| Row 3 | XML Instance 3 | 3 | 0.14159 | XML Instance c | "strings" |

A RELATIONAL DATABASE STORING
XML INSTANCES

FIGURE 1 - Prior Art

| namespace URI |  |
|---|---|
| "http://www.microsoft.com/xquery" | — 201 |
| "" | — 210 |
| "foo" | — 220 |
|  | — 230 |

SQL XML Schema Collection Identifier DB.RelSch.foo

FIGURE 2

CREATE XML SCHEMA COLLECTION <SqlID>/301 AS <expression>/310 [<expression>...]

FIGURE 3

```
<include
   id = ID
   schemaLocation = anyURI        501
   {any attributes with non-schema
namespace . . .}>
   Content: (annotation?)
</include>
```

FIGURE 5

```
<redefine
   id = ID
   schemaLocation = anyURI
   {any attributes with non-schema namespace . . .}>
   Content: (annotation | (simpleType | complexType | group | attributeGroup))*
</redefine>
```

FIGURE 6

```
<import
   id = ID
   namespace = anyURI              701
   schemaLocation = anyURI
   {any attributes with non-schema namespace . . .}>
   Content: (annotation?)
</import>
```

FIGURE 7

ALTER TABLE <table_name>  
ALTER COLUMN <column_name> XML [(<SqlID>)] [NULL | NOT NULL]

FIGURE 9

ALTER TABLE products  
ALTER COLUMN manufacturing_steps XML (msSqlID1) NOT NULL

FIGURE 10

ALTER TABLE products  
ALTER COLUMN manufacturing_steps XML NULL

FIGURE 11

```
                        ,-1220              ,-1210
DROP INDEX xml_index ON products    ,-1230
ALTER TABLE products
ALTER COLUMN manifest (msSqlID2) XML -- this retypes the column
CREATE XML INDEX xml_index ON products (manifest)
                                        `-1201
```

FIGURE 12

1. xml = http://www.w3.org/XML/1998/namespace
2. xs = http://www.w3.org/2001/XMLSchema
3. xsi = http://www.w3.org/2001/XMLSchema-instance
4. fn = http://www.w3.org/2002/11/xquery-functions
5. xdt = http://www.w3.org/2003/02/xquery-datatypes

FIGURE 13 sql = urn:schemas-microsoft-com:xml-sql
sqltypes = http://schemas.microsoft.com/sql/2002/types

FIGURE 14

XML SCHEMA COLLECTION OBJECTS AND CORRESPONDING SYSTEMS AND METHODS

CROSS-REFERENCE TO RELATED CASES

The instant application is a divisional application of U.S. application Ser. No. 10/726,080 filed Dec. 1, 2003, entitled "Xml Schema Collection Objects and Corresponding Systems and Methods," which is incorporated by reference herein in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright©2003, Microsoft Corp.

FIELD OF THE INVENTION

The present invention relates to data storage in a computer system, and more particularly to systems and methods for generating, utilizing and modifying extensible markup language (XML) Schema Collection objects in connection with typing and/or validating XML data, such as XML data in a database.

BACKGROUND OF THE INVENTION

Extensible Markup Language (XML) is quickly becoming the de facto standard for exchanging corporate data via structured documents, whether internally with business partners or via public applications across the Internet. In fact, the World Wide Web Consortium (W3C) has endorsed XML as the standard for document and data representation.

Widespread use of XML has led to the storage of XML data in many different ways. XML data exchanged today can be stored in a relational database or some other data format. In this regard, modern relational databases are capable of storing XML data "instances" within their columns, just as if the instances were any other type of data. Each instance will conform to a particular schema, which provides a format and for the data supplied by an instance.

With more data passed around as XML, and more systems designed to produce it, developers need a way to provide user access to XML instances that conform to a wide variety possible schemas. A tool that has been employed to facilitate user access to instances conforming a variety of schemas is the user-created cache. This tool provides similar function to the use of cache in other settings. The schema cache allows users to identify and store schema namespace Uniform Resource Identifiers (URIs). As a result, the identified schemas are more or less readily accessible to users when they come upon an XML instance that conforms to a schema whose namespace is stored in cache. If many schema namespace URIs are stored, there are techniques employed (generally known as schema location) that disambiguate between schemas that may have namespace URIs with similar properties. This tool does not, however, help users identify the schema to which any particular instance will conform. Nor does it help in searching for instances conforming to various types of schemas.

Developers also require ways to query XML sources for instances that conform to various schemas. One of the first tools that could be used to query these XML data sources was called XML Path Language (XPath). XPath was designed to allow navigation within an XML file by forming simple queries of a single file. Since XPath was designed to navigate and query a single XML data source, using XPath effectively to query multiple data sources requires the developer to perform complex XML document merges using XSLT 1.0 or custom programs. The XPath approach is similar to how some companies create data warehouses today—data from multiple sources is pulled together and transformed into an identical format in a central warehouse repository. Managers can then use that repository's tools to query the data.

XQuery was designed to solve this problem by allowing complex queries across not only multiple XML documents, but also between XML documents, relational databases, object repositories, and other unstructured documents. Going forward, XPath will focus on navigation capabilities (i.e. linking between documents or accessing a specific portion of a document.) in both XQuery and XSLT. This would create a powerful tool to search, aggregate, and present data from disparate sources using a unified query language (XQuery) and a powerful transformation and display formatting language (XSL).

While exciting developments and advances have been made in the realm of querying XML data, there is a need for further advance, especially towards storing, accessing, searching and retrieving XML data in relational databases in a reliable and flexible manner. As companies try to organize and manage an increasing volume of digital information, database systems are becoming a more critical business requirement. Relational database management systems (RDBMS) are widespread, and many companies organize their business around such a system. There are many commercial providers of relational database systems, including MICROSOFT®, IBM®, ORACLE®, SYBASE®, and others. There are also "open source" relational databases available. Relational databases are used for a multitude of operations, and relational database systems have been custom-tailored to fit every need, from keeping track of the inventory of a small business to running Web sites such as AMAZON.COM®.

Queries of relational databases containing XML are limited, however, by the way that XML data are stored in such databases. As mentioned above, XML data are typically stored as "instances," each of which conforms to a "schema". An XML schema provides identification and organization for the data supplied by an XML instance. Specifically, a schema identifies the fields and the relationships between the fields. Because each instance supplies data that is organized according to a specific schema, attempts to mismatch an XML schema and an XML instance will result in computing errors. As a result, XML instances have historically been validated in relational databases according to the schema to which they conform, i.e., currently, a dimension, such as a column, of a database can only be typed according to a single XML schema. Thus, only instances conforming to the particular schema can be, at present, placed in any single column of a relational database. An XML data instance that does not conform to the schema type then results in an error, notifying the developer or system that the XML data instance includes an error.

While enforcing the typing of XML instances in relational database columns according to a single schema can be advantageous in a static system, such enforcement creates a barrier for dynamically changing or evolving systems, i.e., the requirements of relational databases to satisfy business needs frequently change, and the single schema may no longer be congruent with the way XML data is received, accessed or searched in the system. Importantly, it also constrains the freedom of users to store XML instances of differing schema types in the same column. For example, consider the situation where a distributor of books and Digital Versatile Disks (DVDs) (such as AMAZON.COM®) wants to use a relational database to store product information. Using existing technologies, it is very likely that book information, or book instances (e.g., Title, Author, Publisher, Copyright, etc.), will conform to one schema while DVD instances (e.g., Title, Director, Actors, Actresses, Copyright, etc.) will conform to another schema, i.e., it is likely that two separate database dimensions will be used to represent books and DVDs, one column typed according to a book schema, and another column typed according to a DVD schema. Therefore, AMAZON.COM® could not search for both books and DVD's in the same column. Multiple columns will have to be queried, generating greater search complexity, a corresponding increase in computational time and bandwidth, as well as additional opportunity for user error.

Accordingly, a heretofore unaddressed need exists in the industry to address the aforementioned deficiencies and inadequacies in the art.

SUMMARY OF THE INVENTION

In consideration of the above-identified shortcomings of the art, the present invention provides "XML Schema Collection Objects" and methods and systems for using the same. XML data are typically stored as "instances," each of which conforms to a "schema". An XML schema provides identification and organization for the data supplied by an XML instance. "XML Schema Collections," or "XML Schema Collection Objects," then, are collections of one or more XML schema namespaces.

In various non-limiting embodiments, XML Schema Collections are adapted for use in relational databases, enabling users to store XML documents with different target namespaces in the same XML column. In an exemplary implementation, first, an XML Schema Collection object is generated by specifying schemas of various types. The XML Schema Collection object may then be used to type a location specified for XML data, such as a column of a database. Then, XML instances conforming to the appropriate schemas are validated according to the location type when loaded into the system, with reference to the schemas defined by the XML Schema Collection object. If they conform to the rules specified in the governing schema, the database allows these instances to be stored into the system. The query processing engine can subsequently leverage the type information for query optimization, reducing processing time. XML Schema Collection objects can also be modified by appending or deleting schema, and additional options can be selected for XML Schema Collection objects, allowing a dynamically evolving set of XML data, freeing the developer from the task of reconfiguring or redefining an existing schema.

Other advantages and features of the invention are described below.

BRIEF DESCRIPTION OF THE DRAWINGS

The systems and methods for creating and using XML Schema Collections in accordance with the present invention are further described with reference to the accompanying drawings in which:

FIG. 1 is an exemplary relational database storing XML instances;

FIG. 2 is an exemplary SQL XML Schema Collection object DB.RelSch.foo, which is intended to conceptually represent XML Schema Collection objects generally;

FIG. 3 is exemplary SQL syntax for creating an XML Schema Collection;

FIG. 5 is exemplary SQL syntax for the "include" function which can be used in conjunction with the present invention;

FIG. 6 is exemplary SQL syntax for the "redefine" function which can be used in conjunction with the present invention;

FIG. 7 is exemplary SQL syntax for the "import" function which can be used in conjunction with the present invention;

FIGS. 9, 10, and 11 are further non-limiting examples of SQL syntax for the "include" function which can be used in conjunction with the present invention;

FIG. 12 is exemplary SQL syntax for the "drop" function which can be used in conjunction with the present invention;

FIG. 13 is a list of the five predefined namespace prefixes used by XQuery;

FIG. 14 is a list of the two SQL SERVER® specific predefined namespaces;

DETAILED DESCRIPTION OF ILLUSTRATIVE EMBODIMENTS

Overview

Figure 4:
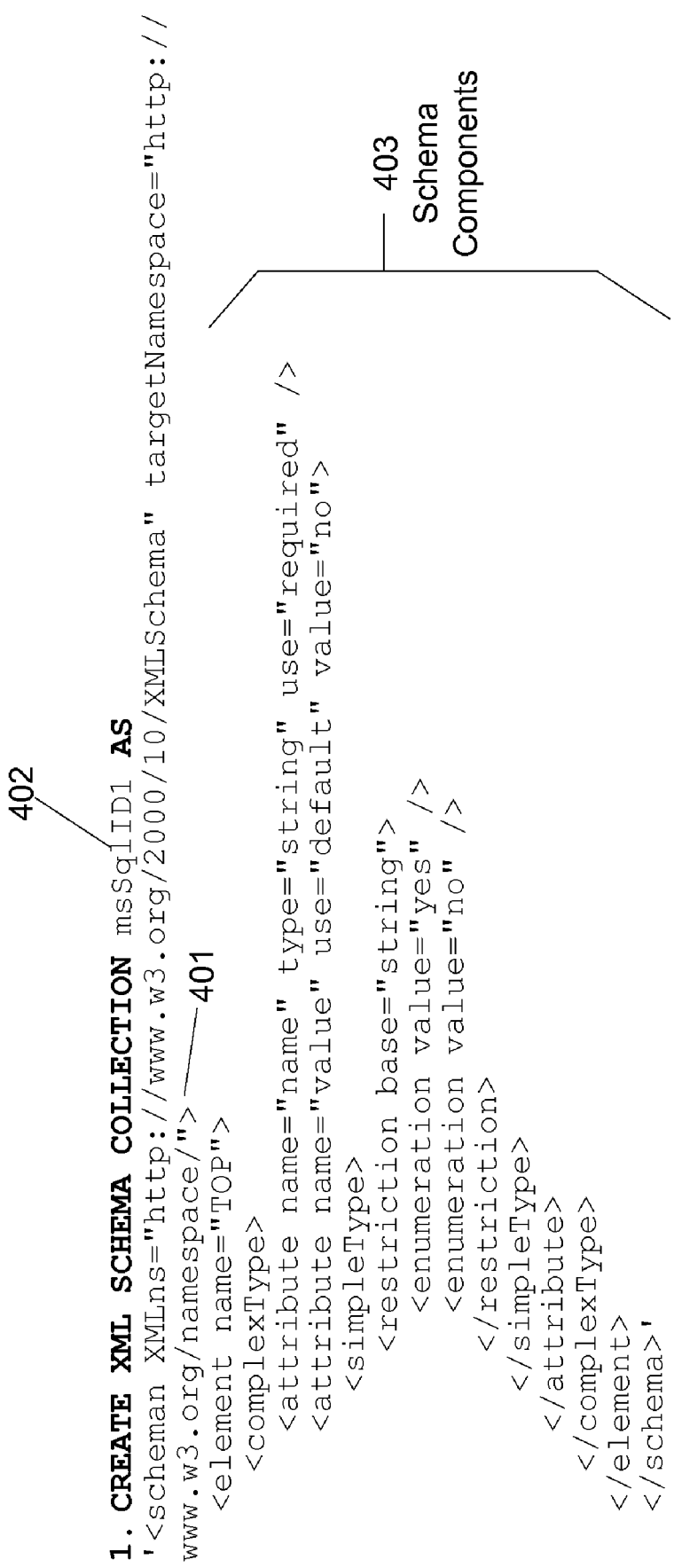
FIG. 4 is a further non-limiting demonstration of potential syntax for creating an XML Schema Collection.

As mentioned, the present invention provides "XML Schema Collection Objects" and methods and systems for using the same. XML data are typically stored as "instances," each of which potentially conforms to a "schema". An XML schema provides identification and organization for the data supplied by an XML instance. "XML Schema Collections," or "XML Schema Collection Objects," then, are collections of one or more XML schema namespaces that are used to type (or define the permitted XML instances) a data storage location such that XML instances stored therein will first be validated as conforming to one of the schemas associated with the collection object. In general, an XML schema namespace is a collection of element type and attribute names that uniquely identify a set of names so that there is no ambiguity when objects having different origins but the same names are mixed together. Disambiguation between such objects is provided by schema location techniques, which can be used in conjunction with the present invention, either to locate a schema collection object or to locate the schemas referred to within a schema collection object.

XML Schema Collections can be adapted for use in relational databases. A relational database is essentially a table containing data in multiple dimensions, such as columns and/or rows. An XML column in a relational database can be "typed" with an XML schema to conform XML instances in that column to the schema. When an XML instance conforming to a given XML schema is found in a relational database, the instance is accessed according to the contours of the schema, and as a result, the data can be effectively interpreted.

The prior art configurations did not allow users to effectively store XML instances conforming to more than one XML schema in the same column of a relational database. XML Schema Collections overcome this difficulty by enabling users to store XML documents with different target namespaces in the same XML column. First, an XML Schema Collection object is generated by specifying schemas of various types. The XML Schema Collection object may then be used to type a location specified for XML data, such as a column of a database. Then, XML instances conforming to the appropriate schemas are validated according to the location type when loaded into the system, with reference to the schemas defined by the XML Schema Collection object. If they conform to the rules specified in the governing schema, the database allows these instances to be stored into the system. The query processing engine can subsequently leverage the type information for query optimization, reducing processing time. XML Schema Collection objects can also be modified by appending or deleting schema, and additional options can be selected for XML Schema Collection objects, allowing a dynamically evolving set of XML data, freeing the developer from the task of reconfiguring or redefining an existing schema.

In some sections descriptive of embodiments of the invention, the subject matter is described with specificity in accordance with statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Exemplary embodiments of the present invention are described in conjunction with MICROSOFT'S SQL SERVER® product, however, the features as described in the exemplary embodiments are not intended to limit those features to the embodiments, but are rather intended as examples of features that can readily be adapted to other available circumstances. For instance, while the techniques of the invention are invariably described in connection with typing a column of a relational database with an XML Schema Collection object, the invention is not considered to be so limited. In this regard, an XML Schema Collection object can not only be used for typing and validating data stored in a relational database, but an XML Schema Collection object can be applied to XML data wherever located, or however stored, or with any data structural format.

The present invention provides "XML Schema Collections" and a method of using the same. XML, or eXtensible Markup Language, is a meta-mark-up language for text documents. XML is a World Wide Web Consortium (W3C) endorsed standard for document and data representation that provides a generic syntax to mark up data with human-readable tags. XML does not have a fixed set of tags and thus allows users to define such tags as long as they conform to the XML standard. For example, some data is included in XML documents as strings of text, and the data is surrounded by text markup that describes the data. A particular unit of data and markup is called an element. An XML specification defines the syntax this markup must follow: how elements are delimited by tags, what a tag looks like, what names are acceptable for elements, where attributes are placed, and so forth. The W3C has codified XML's abstract data model in a specification called the XML information set (XML Infoset).

XML as an extensible mark-up language continues to evolve, for more flexible use with different environments. In addition, it is understood that XML data can, and often is, manipulated with many kinds of computer software. The present invention is not limited to the version of XML involved, the software that is used to manipulate XML data, or the software development tool used to assist in generating programming code. Rather, as described below, the invention is contemplated for use in broadly defined computing environments, including, but not limited to, a distributed computing environment, such as peer to peer environments, standalone computing environments, PC environments as well as portable computing device environments, and wireless as well as wired network environments.

XML is flexible in the elements it allows to be defined, but it is strict in many other respects. It provides a grammar for XML documents that regulates placement of tags, where tags appear, which element names are legal, how attributes are attached to elements, and so forth. This grammar is specific enough to allow development of XML parsers that can read and understand any XML document. Documents that satisfy this grammar are said to be well-formed.

To enhance interoperability, individuals or organizations may agree to use only certain tags. These tag sets are called XML applications. An XML application is not a software application like MICROSOFT WORD or MICROSOFT EXCEL. It is a tag set that provides for enhanced functionality of XML for a specific purpose, such as vector graphics, financial data, cooking recipes, or publishing.

XML schemas may be used to apply a structure to the XML format and content. An XML schema is a type of XML application, namely one that can describe the allowed content of instances conforming to a particular XML vocabulary. Because an XML schema provides the relationship and identity of data fields in an XML instance, there are an infinite number of possible schemas. A schema may be large or small, according to the nature of the XML instance it is designed to serve. The present invention is not limited to use with any single type(s) of schema, and it is noted that new schemas are constantly developed.

XML schemas and instances can be conceptually illustrated through the example of a hypothetical book publisher. The publisher may use an XML application for its business, so that when it provides data (about books, sales, customers, etc.) to other publishers, authors, and customers, they benefit from the increased functionality provided by the XML application, which may be standard in the industry. In addition, the publisher may adopt an XML schema for books, so that every time its computers (and those of his cohorts) access information on books, they access the same information. The information is configured and constrained by the XML schema such that it is uniform for all books. XML schemas provide a way to enforce constraints and provide content validation of XML instances. The XML datatype allows the storage of XML fragments as long as the instance is well formed XML.

An XML instance is a set of XML data that is designed to fit into the structure provided by an XML schema. Those skilled in the art will appreciate that the range of possible XML instances is infinite, just as the schemas that provide their structure. In addition to the vector graphics and cooking recipes discussed in the background section, an XML instance could provide data for a space ship, a mouse, a volcano, anything. Because the range of potential data types is infinite, so is the range of potential XML instances (and the schemas that structure them). Thus, the present invention is in no way limited to any type or category of XML instances, i.e., new instances are continually being developed, and accordingly, any and all XML instances may be used in conjunction with the present invention.

An XML Schema Collection in accordance with the invention comprises a container for XML schema namespaces that can be used to type a location where XML data can be stored. While the XML Schema Collection contains at least one XML schema namespace, it may also contain other items providing other functionalities. Thus, the present invention is not limited to containing exclusively namespaces. Likewise, each XML Schema Collection can contain multiple XML schema namespace URIs (Uniform Resource Identifiers). The number of XML schema namespace URIs is theoretically unlimited, although in practice it is limited only by the practical requirements of the individual XML Schema Collections objects, in light of the desired functionalities in the context in which they are used.

In general, a namespace uniquely identifies a set of names so that there is no ambiguity when objects having different origins but the same names are mixed together. In XML, an XML namespace is a collection of element type and attribute names. These element types and attribute names are uniquely identified by the name of the unique XML namespace of which they are a part. In an XML document, any element type or attribute name can thus have a two-part name consisting of the name of its namespace and then its local (functional) name. Sometimes, a single namespace URI may refer to more than one schema. Advanced schema location techniques may be employed in conjunction with the present invention to disambiguate between schemas, and determine which schema should be used with a particular instance.

For an example of the use of namespaces, suppose the same XML document included the element type of OWNER for owners of motorcycles as well as for owners of automobiles. It might be necessary or desirable to know that an owner name was one of those who owned a motorcycle rather than an automobile. Having different motorcycle and automobile namespaces would make this possible. Effectively, it would make it possible to label motorcycle owners differently than automobile owners without having to create a different element type for each.

In XML, a namespace is commonly given the name of a Uniform Resource Identifier (URI)—such as a Web site's address—both because the namespace may be associated with the site or page of that URI (for example, a company name) and because a URI is conveniently likely to be a unique name. Note that the URI is not necessarily intended to be used other than as a name nor is there any namespace document or XML schema that must be accessed; the URI is simply used as a name (and part of the two-part name of any element type or attribute name so that the names are unique within the document).

In light of the background explanations provided above regarding XML and XML schemas, instances, and namespaces, embodiments and application of the present invention are now described. XML Schema Collections in accordance with the invention provide container(s) for XML schema namespaces and the associated implements that make use of the XML Schema Collections possible. The context for the use of this invention and the advantages of the present invention over the prior art are further described below. The relational database supplies a ready context for use of XML Schema Collections. This setting is an embodiment of the invention, i.e., those skilled in the art will appreciate the existence of other contexts in which practice of the invention would be beneficial and advantageous. More particularly, the XML Schema Collections can be used in any setting where XML instances conforming to one or more schema are to be typed or validated according to the appropriate schema.

As discussed, XML Schema Collections can be adapted for use in connection with databases, such as relational databases. A relational database is essentially a table containing data in columns and/or rows. Relational databases are able to store data in any number of dimensions and are well known in the art. Some leading relational database products, by way of example and not limitation, are MICROSOFT'S SQL SERVER®, IBM DB2 v8.1®, SYBASE IQ®, and ORACLE 9iR2®. The present invention is applicable to any type of storage location, such as a relational database, that supports storage of XML instances, regardless of the maker or particular features of the storage location.

A conceptual illustration of an exemplary prior art relational database is illustrated in FIG. 1. As shown, a table can be created with one or more columns, which can be typed according to a single XML schema, and XML instances can be stored in those columns. Additionally, the XML columns can be indexed, and the XML instances in those columns can be queried. An XML column can thus be "typed" using a single XML schema to conform XML instances in that column to the schema during a validation process. For example, Column 1 could be typed according to a "book" schema, and instances (such as XML Instances 1, 2, and 3) stored in Column 1 would contain data about books. Column 4 could be typed according to a "DVD" schema, and instances (such as XML Instances a, b, and c) stored in Column 4 would contain data about DVDs. Thus, in the same way that columns 2, 3 and 5 can be typed to store integers, floating point numbers and strings, respectively, a column can be typed according to an XML schema. When an XML instance conforming to a given XML schema is found in a relational database, the instance is accessed according to the contours of the schema, and as a result, the data can be effectively interpreted.

Existing database management systems provide support for storing XML data in a relational database store. For example, Microsoft's SQL SERVER® provides support for XML data type columns, variables and parameters. One can create a table with one or more XML columns, store XML values in the XML columns, type an XML column using an XML schema namespace, index the XML column, and query against the XML instances.

However, there is no current way to store XML instances conforming to not just one, but several schemas, in the same column of a relational database, i.e., currently, it cannot be done because an attempt to do so would result in validation errors for XML instances of different types. For example, referring again to FIG. 1 and imagining that odd numbered XML instances 1 and 3 conform to a "book" schema, while the even numbered XML instance 2 conforms to a "DVD" schema: the odd numbered XML instances specify the title of the book, the author of the book, the publishing house, the Copyright year, and so on. The even numbered XML instances specify the title of the DVD, the actors and actresses, the director, the genre, the rating, the year released, etc. Assuming it is desirable to store both books and DVDs in the same columns for data processing efficiencies associated with making determinations for all media, i.e., books and DVDs, at once, the question arises as to which schema should be used to understand and enforce rules on the XML instances in the column, i.e., how the column should be typed. Previously, only data conforming to one schema could be stored in a single column. The schema to be used to identify the column would be identified by column type, and any data instance that did not conform to the identified schema would generate an error. As a result, in the past, developers would resort to defining a schema, or redefining an existing schema, that covered either a book or a DVD, for instance, by including an element that specified whether the XML instance was a book or a DVD. To recreate the schema each time the needs of storage change, however, is a cumbersome process.

When XML Schema Collections are used in accordance with the present invention, storage of XML instances conforming to various types of schemas in the same column of a relational database is facilitated. When creating an XML Schema Collection in accordance with the invention, a container object is created and schemas of various types are specified. Next, a function call is made which assigns the XML Schema Collection to a storage location, such as a column, for storing XML instances in the database. Having the typed the storage location according to the XML Schema Collection, XML instances can be validated according to the schemas represented by the XML Schema Collection when stored into the system. If they conform to the rules specified in the governing collection of schemas, the database allows these instances to be stored into the system. The query processing engine can subsequently leverage the type information for query optimization, e.g., for Data Manipulation Language (DML) and/or Data Description Language (DDL) operations against XML data. Storage optimization based on type information is another advantage. Remember, XML Schema Collections provide objects (namely, XML Schema Collection objects) that act as containers for XML schema namespaces. XML Schema Collections enable users to store XML documents with different target namespaces in the same XML column. Users can constrain an XML column, parameter and variable using an XML Schema Collection. This allows them to store instances of XML data conforming to any one of the XML schema namespaces within the column constrained by the XML Schema Collection. XML Schema Collections can be modified dynamically as well.

First Exemplary Embodiment

Figures 15A, 15B:
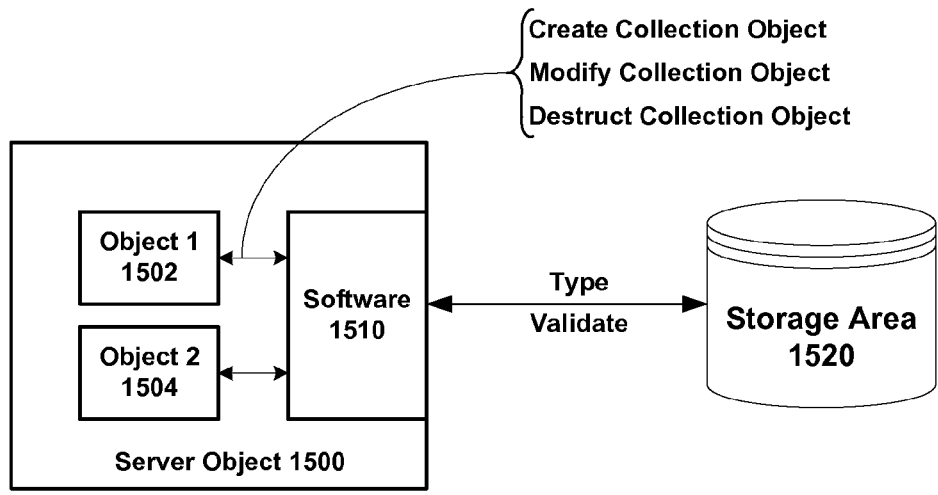
FIG. 15A illustrates an exemplary environment for operation of the present invention.
FIG. 15B illustrates an exemplary use of an XML Schema Collection object in accordance with the present invention.

A first exemplary embodiment of the present invention is illustrated in FIGS. 15A and 15B. Referring to FIG. 15A, the invention may be practiced in conjunction with a Server Object 1500 and a Storage Area 1520. The Server Object 1500 and the Storage Area 1520 can be thought of as a computing device (and/or firmware/software on the computing device) and as memory included in or communicatively coupled to the computing device, respectively. It is noted that the terms of art "object" and "memory" are flexible and designate objects that may be carried out by or in a wide variety of hardware and software configurations. For a further explanation of the computing environment for which this invention is intended, refer to FIGS. 16A, 16B, 16C, and accompanying text, which begins under the heading "Exemplary Networked and Distributed Environments" in this document.

Server Object 1500 is capable of carrying out instructions designated by Software 1510. The term "software" as used here refers to any and all software which is capable of providing instructions to server object 1500, and need not be a single piece of software designed for a unique function. Firmware, e.g., microprocessors, may also be programmed to provide an interface function as well. Software 1510 in this embodiment may automatically instruct the Server Object 1500 to carry out certain instructions, and it may allow user input (user not pictured here) to determine the instructions given to the Server Object 1500. In this regard, Software 1510 may instruct Server Object 1500 to create, modify, destruct, move or otherwise manipulate Object 1 1502 and Object 2 1504. Object 1 1502 may be, for example, an XML Schema Collection Object. Object 2 1504 may be, for example, an XML instance. In this scenario, Software 1510 is also capable of storing Object 1 1502 and Object 2 1504 in Storage Area 1520.

Upon creation of Object 1 1502 (the XML Schema Collection Object) Software 1510 may (automatically or upon user instructions) instruct the Server Object to "type" the Storage Area 1520, or a portion thereof, with Object 1 1502. In conjunction with a validation process that enforces the schemas specified by Object 1 1502, the result is that XML instances that conform to one or more schemas specified by Object 1 1502 can be stored in the designated portion of the Storage Area 1520. As described above, an XML Schema Collection Object is a collection of XML schema namespaces. Object 1 1502 in this embodiment thus allows XML instances that are "validated" against the schemas represented by the XML schema namespaces in the XML Schema Collection Object (i.e., Object 1 1502). Therefore, if Object 2 1504 conforms to one of the schemas represented by the XML Schema Collection, it can be stored into the designated portion of Storage Area 1520.

FIG. 15B conceptually represents one potential layout of Storage Area 1520. As illustrated, Storage Area 1520 is divided into columns and rows. Column 1 has been typed with an XML Schema Collection Object (e.g. Object 1 1502). The other columns have also been typed, in that they allow only data that conforms to a particular format: Column 2 has been typed for integers, Column 3 for float, Column 4 for data conforming to Schema 2, and so on. In FIG. 15B, XML instances enumerated by numbers (1, 2, 3 . . . ) represent instances conforming to one XML schema (e.g., books), while XML instances enumerated by letters (a, b, c . . . ) represent XML instances conforming to some different XML schema (e.g., DVDs). In this example, an XML Schema Collection permits Column 1 to store instances conforming to two different XML schemas. In contrast, Column 4 has been typed with a single schema (XML Schema 2), and therefore can only store XML instances conforming to XML Schema 2. Alternatively, with the invention, one could specify an XML Schema Collection that includes XML Schema 2. Thus, as the needs of column 4 grow with the needs of the business, one merely need add an additional XML schema to the XML Schema Collection typed on column 4.

Second Exemplary Embodiment

XML Schema Collections Used with SQL SERVER®

In a second embodiment, the present invention is used in conjunction with MICROSOFT'S SQL SERVER® product. The following embodiment is not intended to limit the scope of the invention, but rather to more fully explain the possible features of the invention. Those skilled in the art will readily comprehend that the following embodiment and all of the advantages and limitations thereof can be easily adapted and used in the context of other relational databases.

In the SQL SERVER® context, as mentioned, SQL SERVER® provides native storage of XML data through the use of the XML data type. XML Schema Definition (XSD) is the format used for importing and exporting schema information applied to XML data. XSD is used both as a mechanism for both validation and typing of XML instance data.

The SQL XML Schema Collection object (SqlID) is (in this non-limiting embodiment) a first class SQL object which is a container for XML schema namespaces and is identified by a three part name, "DB.RelSch.SqlID," where the DB='database name', RelSch='relational schema' and SqlID='SQL XML Schema Collection Identifier'. The scope of a SQL XML Schema Collection Identifier is the relational schema within which it is created.

Each SQL XML Schema Collection can contain multiple XML schema namespace URI's. The XML schema namespace is unique within a SQL XML Schema Collection.

An exemplary SQL XML Schema Collection DB.RelSch.foo is conceptually represented in FIG. 2. It may be preferable in this embodiment to allow each SQL XML Schema Collection to optionally have at most one "no targetNamespace" XML schema namespace. In this non-limiting embodiment, the "no targetNamespace" XML schema namespace is internally associated with " " as the namespace URI.

Each user can create multiple relational schemas using the existing SQL statement CREATE SCHEMA, as displayed in FIG. 3. The syntax used in FIG. 3, like the syntax of other figures, is not intended to limit the possible syntax available to serve the functionality described. Those skilled in the art will acknowledge that a variety of syntax (or pseudo code) possibilities are possible for implementation of computer software. In FIG. 3, "SqlID" 301 is a SQL XML Schema Collection Identifier. "Expression" 310 is a literal scalar expression returning a string result which is a set of one or more complete and valid XML schema definitions. "Expression" 310 could also be a SQL variable of any character type or XML data type (with implicit conversion to text) which is a set of one or more complete and valid XML schema definitions. The XSD represented by "expression" 310 can contain an optional target namespace attribute which specifies the XML schema namespace (which is a URI) that is to be associated with the schema components specified within "expression" 310. The XML schema namespace URIs within an individual XML Schema Collection are unique. If the SQL XML Schema Collection already exists, then the CREATE statement of FIG. 3 may fail. In one embodiment, if no target namespace is specified, then the "no targetNamespace" XML schema namespace is assumed by default. The code generated by FIG. 3 creates the SQL XML Schema Collection namespace meta-data object.

Note that in this non-limiting embodiment, the user is not allowed to create an empty SQL XML Schema Collection object; i.e., the user cannot create a SQL XML Schema Collection object without loading at least one schema components. It is, however, possible for the user not to specify a particular relational schema in a DDL statement, so long as a user's default schema is specified automatically.

An example demonstrating the creation of a SQL XML Schema Collection database.schema.msSqlID1 is provided in FIG. 4. The XML schema namespace 'http://www.w3.org/namespace/' 401 is created within msSqlID1 402 and the schema components 403 are loaded into, or specified for, the object represented by identifier 402. Once again, this illustration is in no way intended to limit the present invention. It is an illustration one way to create an exemplary XML Schema Collection. Other techniques may be employed, and other schema contents can be loaded into the object created.

The invention may be used in conjunction with an "include" function, so that schema components for a single namespace can be assembled from several schema documents. See FIG. 5 for an exemplary "include" function in the SQL SERVER® context. FIG. 5 is not intended to be a demonstration of the only way to provide this functionality, rather it is included here to better guide those skilled in the art. "Include" elements have schemaLocation 501 attributes, which is a URI reference, which identify other schema documents. Thus, the schema that has the "include" element has not only the components corresponding to its definition and declaration but also all of the components of all the XML schemas corresponding to any schema documents specified in "include" elements. In this embodiment, it may be useful to ignore the schemaLocation 501 attribute. The schema components from the XML schema namespace to which the target namespace refers can be included by default. If there is no target namespace, then the schema components from the "no targetNamespace" XML schema namespace can be included.

The invention may also be used in conjunction with a "redefine" function which is similar to an include, but may be used to specify new definitions of some or all of the components in the redefined schema documents. In one embodiment, the schema components that can be redefined are complex types, simple types, named model groups and attribute groups. In the SQL SERVER® context, the "redefine" element may be ignored because altering existing schema components is not allowed. See FIG. 6 for an exemplary implementation of the "redefine" function. FIG. 6 is not intended to be limiting, but rather a demonstration of one possible way to implement the "redefine" functionality in conjunction with the present invention.

The invention may also be used in conjunction with an "import" function, shown in FIG. 7, which is a way to refer to schema components in other XML schema namespaces. For example, to derive a type from a type in another XML schema namespace, one must import that namespace. The "import" element can have a schemaLocation 701 attribute that specifies the location of a schema document which describes components in the imported namespace. However, this is just a location hint and the processor is not required to try to resolve it.

In the SQL SERVER® context, for XML Schema Collections in accordance with the present embodiment, schema namespaces within the same relational namespace are respected. For instance, if the user tries to import an XML schema namespace from another relational namespace, an error may be generated. A reference, or placeholder, is retained to the imported XML schema namespace. Finally, the "import" element can be serialized when the intrinsic function XML_SCHEMA_NAMESPACE is used. FIG. 7 is not intended to be limiting, but rather a demonstration of one possible way to implement the "import" functionality in conjunction with the present invention.

Figure 8:
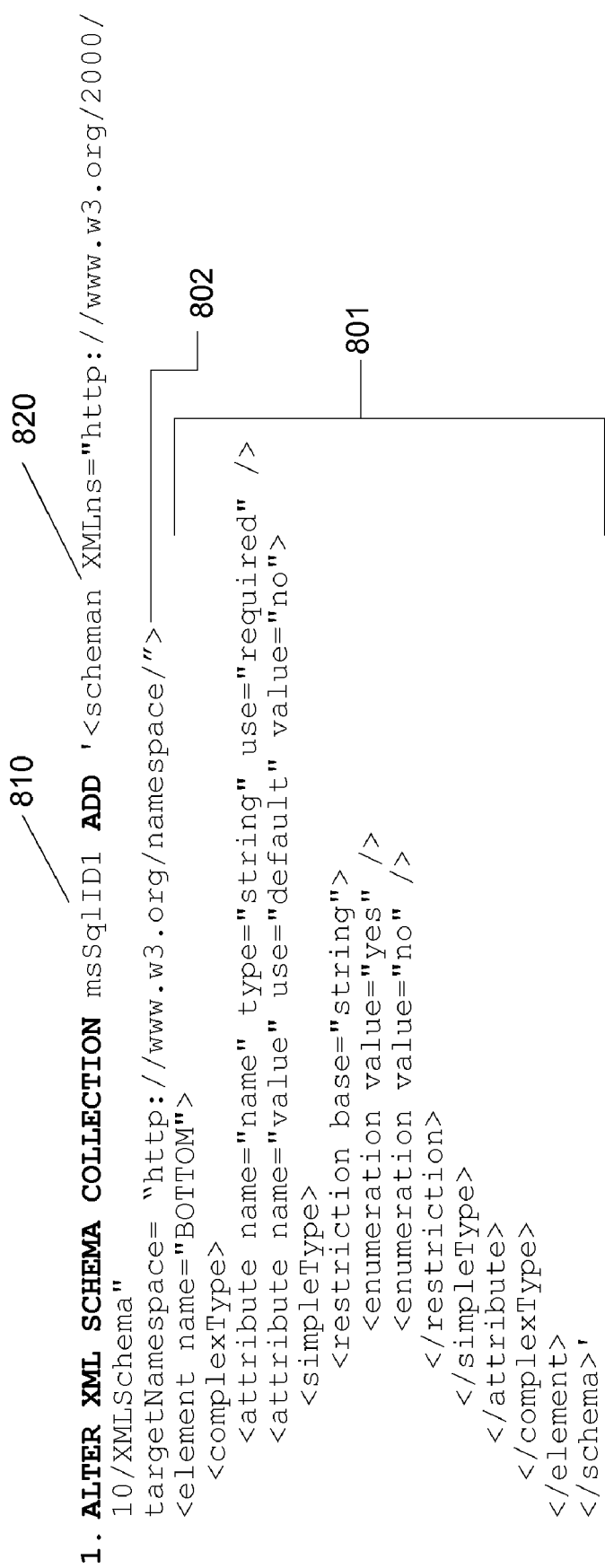
FIG. 8 is exemplary SQL syntax for the "alter" function which can be used in conjunction with the present invention.

The SQL SERVER® embodiment explained here may also be used in conjunction with an "alter" function FIG. 8, which allows users to add schema components 801 to XML schema namespaces 802 within SQL XML Schema Collections. In FIG. 8, "msSqlID" 810 is an exemplary SQL XML Schema Collection Identifier. "scheman XMLns=" http://www.w3.org/2000/10/XMLSchema targetNamespace="http://www.w3.org/namespace/" 820 is a literal scalar expression returning a string result which is a set of one or more complete and valid XML schema definitions, and a SQL variable of any character type or XML data type (with implicit conversion to text) which is a set of one or more complete and valid XML schema definitions. The syntax of FIG. 8 adds the supplied XSD schema components into the XML schema namespace (inside "msSqlID") specified within the "expression" which in FIG. 8 is "scheman XMLns="http://www.w3.org/2000/10/XMLSchema" targetNamespace="http://www.w3.org/namespace/". If no target namespace is specified, then the "no targetnamespace" XML schema namespace is assumed.

Users can add new schema components 801 to existing XML schema namespaces 810 as long as it does not conflict with the existing schema component definitions. In order to alter existing schema components, users can create a new XML Schema Collections with the altered schema components 1401 and then re-type the columns using the new XML Schema Collection.

It may be preferable to not allow alteration of existing schema components. In this embodiment, an ALTER XML SCHEMA NAMSPACE statement FIG. 8 that tries to modify an existing schema component may result in an error. Existing schema components are not allowed to be altered to avoid having to re-validate existing XML datatype instances against the new schema before actually altering the XML schema namespace. However, such a rule may not be advantageous in other contexts, and accordingly, in alternate embodiments of the invention, the schemas represented by an XML Schema Collection may be altered.

Additionally, in this embodiment, if there are XML columns that are typed using a SQL XML Schema Collection, then it may be preferable not to allow the SQL XML Schema Collection object to be dropped before un-typing all those columns. In any case, when an XML Schema Collection object is altered or dropped, then cached query plans that are based on that XML Schema Collection are revalidated.

In the SQL SERVER® embodiment described herein, it may be useful to "type" an "un-typed" XML storage location, such as a column, using a SQL XML Schema Collection Identifier. It may also be useful to "re-type" an XML column with another SQL XML Schema Collection Identifier. "Typing" an XML column refers to associating that column with an XML Schema Collection object. FIG. 9 illustrates one non-limiting example of how to "type" or "re-type" an XML column in a relational database. "SqlID" 901 is a SQL SERVER® XML Schema Collection Identifier. "table_name" 910 is a relational table. "column_name" 920 is a column in "table_name" 910. In this scenario, if "SqlID" 901 is not specified then the XML column 920 is made un-typed. The syntax of FIG. 9 alters the column 920 meta-data. A typed XML column 920 may be made untyped (in which case it requires no validation), or an untyped XML column 920 may be typed using a SQL XML Schema Collection Identifier (which requires validation).

If the XML column 920 is already typed using a SQL XML Schema Collection Identifier then, if "SqlID" 901 is specified then the XML column 920 is retyped using the new SQL XML Schema Collection Identifier. The XML instances in the column 920 are again validated using the new SQL XML Schema Collection object and the statement succeeds only if the validation is successful. Otherwise it fails with an error.

If an XML index exists on the XML column 920, the statement FIG. 9 fails. If an XML index exists on the column 920 then the user has to drop the index first and then create an index on the XML column 920 after untyping it or re-typing it using a SQL XML Schema Collection Identifier.

Several examples of typing and un-typing XML columns in a relational database are provided in FIGS. 10-12. The exemplary syntax of FIG. 10 types an XML column "manufacturing steps" 1001 in the table products 1010 using the SQL XML Schema Collection Identifier msSqlID1 1020. The exemplary syntax of FIG. 11 un-types the XML column "manufacturing_steps" 1101 in the "table products" 1110. Finally, the exemplary syntax of FIG. 12 demonstrates that if the column manifest 1201 (typed using msSqlID1) in the table "products" 1210 has an XML Index 1220 on it then it can be typed using msSqlID2 1230 using the statements as illustrated. As with all of the syntax examples provided, FIGS. 10, 11, and 12 are not intended to provide the only available syntax to provide the operations described. Instead, they are specific examples to guide the understanding of those skilled in the art.

The SQL SERVER® embodiment of the present invention described here may also be used in conjunction with pre-defined XML schema namespaces. XQuery has five pre-defined namespace prefixes that are present in the in-scope namespaces before each query is processed. The five XQuery predefined namespace prefixes are provided in FIG. 13. These prefixes may be used without an explicit declaration. Their definitions may be overridden by namespace declarations in the Query Prolog or by namespace declaration attributes on constructed elements (except for the prefix xml, which may not be redefined). These predefined namespaces may not be altered, as a general matter, meaning the namespaces cannot be dropped, schema components may not be added, and existing schema components may not be altered. In addition to the five predefined namespaces of FIG. 13, there are at this time two SQL SERVER® specific predefined namespaces, provided in FIG. 14. These XML schema namespaces are created by default within each SQL XML Schema Collection object when the CREATE XML SCHEMA statement is executed.

A problem arises in conjunction with the predefined namespaces when a schema is used with the same target namespace as one of the pre-defined namespaces. If pre-defined namespaces are created within the SQL XML Schema Collection object before the user-specified namespaces are created, then an error will occur. It is no solution to create the predefined namespaces after the user specified namespaces, because this leaves open the possibility of the same name occurring twice. One non-limiting way to handle this problem is to create the user-specified namespaces and then create the predefined namespaces if those namespaces aren't already in the SQL XML Schema Collection object.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with XML Schema Collections in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. XML Schema Collections is particularly relevant to those computing devices operating in a network or distributed computing environment, and thus storage and query techniques in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the storage and querying processes of the invention.

Figure 16A:
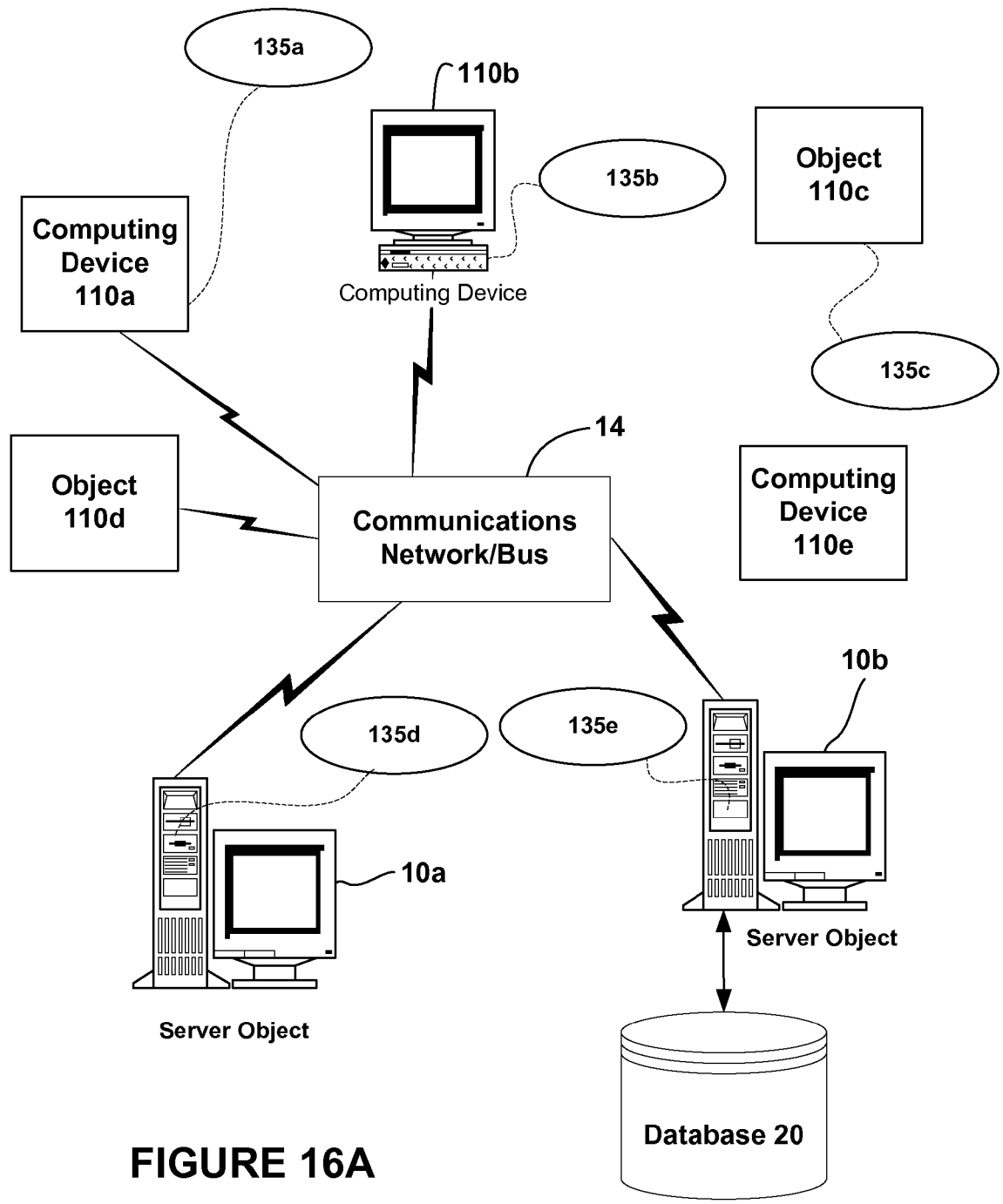
FIG. 16A is a block diagram representing an exemplary network environment having a variety of computing devices in which the present invention may be implemented.

FIG. 16A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 16A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the XML Schema Collections processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to XML Schema Collections according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the XML Schema Collection in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e. roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 16A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the storage and query techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the storage and query techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 16A illustrates an exemplary networked or distributed environment, with a server in communication with client computers via a network/bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement XML Schema Collections.

In a network environment in which the communications network/bus 14 is the Internet, for example, the servers 10*a*, 10*b*, etc. can be Web servers with which the clients 110*a*, 110*b*, 110*c*, 110*d*, 110*e*, etc. communicate via any of a number of known protocols such as HTTP. Servers 10*a*, 10*b*, etc. may also serve as clients 110*a*, 110*b*, 110*c*, 110*d*, 110*e*, etc., as may be characteristic of a distributed computing environment. Communications may be wired or wireless, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 10*a*, 10*b*, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10*a*, 10*b*, 110*a*, 110*b*, etc. may be responsible for the maintenance and updating of a database 20 or other storage element, such as a database or memory 20 for storing data processed according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Exemplary Computing Device

Figure 16B:
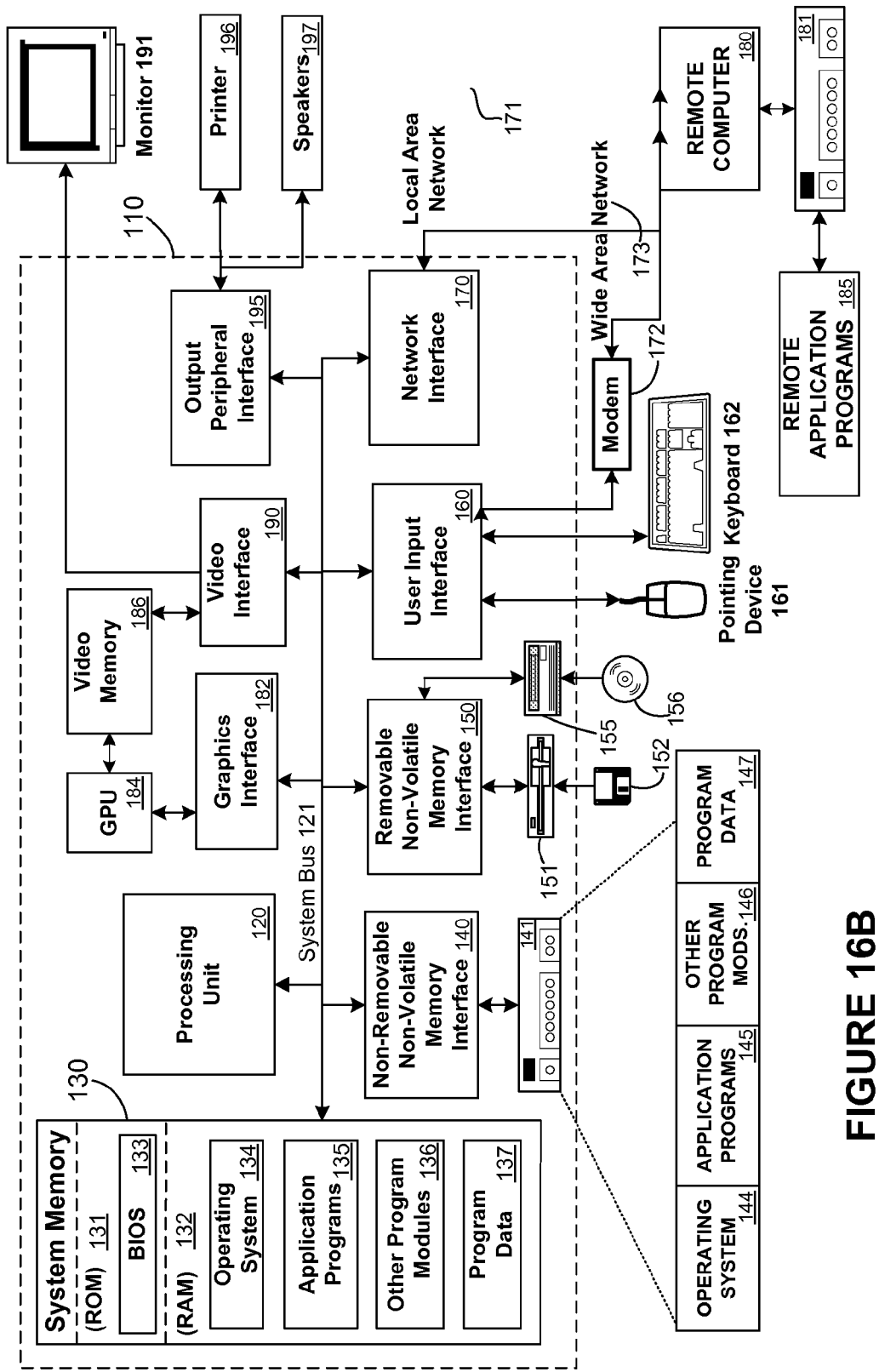
FIG. 16B is a block diagram representing an exemplary non-limiting computing device in which the present invention may be implemented.
Figure 16C:
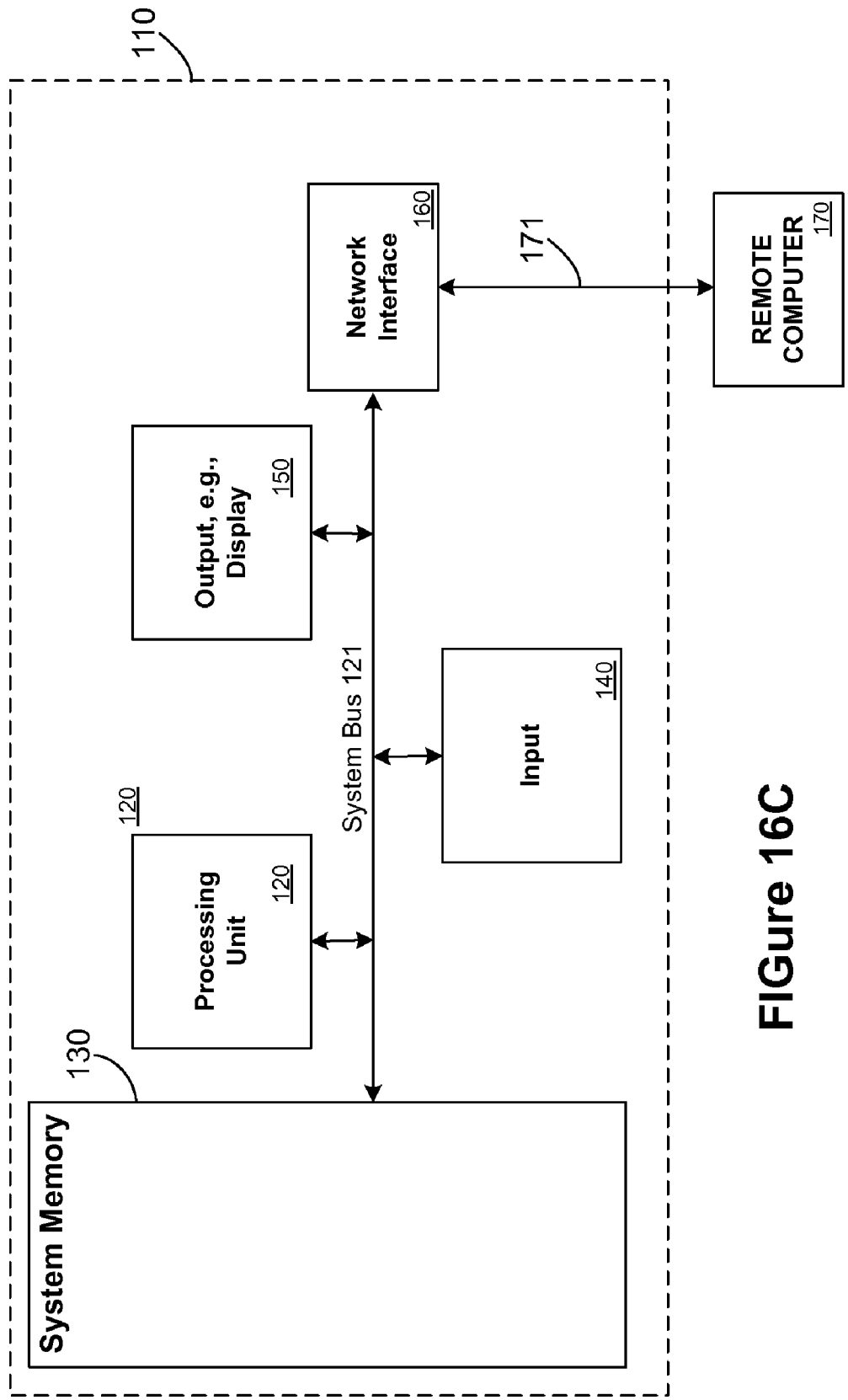
FIG. 16C is an exemplary computing environment.

FIG. 16B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e. anywhere where that storage of XML instances is found in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the XML schema collections techniques in accordance with the invention.

Although not required, the invention can be implemented via an operating system, for use by a developer of services for a device or object, and/or included within application software that operates in connection with the XML Schema Collections techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 16B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 16B illustrates operating system 134, application programs 135, other program modules 136, and program data 137.

The computer 110 may also include other removable/non-removable, volatile/nonvolatile computer storage media. By way of example only, FIG. 16B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 16B provide storage of computer readable instructions, data structures, program modules and other data for the computer 110. In FIG. 16B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 16B. The logical connections depicted in FIG. 16B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 16B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e. .NET, includes servers, building-block services, such as Web-based data storage and downloadable device software.

Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the XML Schema Collections system and methods of the invention. The invention contemplates the use of the invention from the standpoint of an API (or other software object), as well as from a software or hardware object that receives XML Schema Collections techniques in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to store XML instances. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e. instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the XML instance storage and retrieval techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a relational database, the invention is not so limited, but rather may be implemented to provide storage and retrieval of XML instance in any context. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A tangible computer-readable storage medium, comprising:
   a data structure stored on the computer-readable storage medium comprising a plurality of extensible markup language (XML) instances, at least two XML instances of said plurality of XML instances are stored in a column of a database, and said at least two XML instances do not conform to the same XML schema, and said column of the database is designated for storing XML data according to an object that represents two or more XML schema namespaces,
   wherein XML instance comprises a set of XML data conforming to a structure provided by XML schema, XML schema identifies and organizes data in an XML instance, and XML schema namespace is used to ensure unique naming of elements and attributes in an XML schema.

2. The computer-readable storage medium of claim 1, wherein said column of the database is typed with said object containing two or more XML schema namespaces.

3. The computer-readable storage medium of claim 1, wherein said object contains two or more XML schema namespaces and is used to validate at least one of the XML instances in said column of the database.

4. The computer-readable storage medium of claim 1, wherein said object containing two or more XML schema namespaces is used in conjunction with an import function which modifies said object containing two or more XML schema namespaces so that it refers to schema components in other XML schema namespaces.

5. The computer-readable storage medium of claim 1, wherein said object containing two or more XML schema namespaces is used in conjunction with an include function which allows assembly of schema components for a single namespace from several schema documents.

6. The computer-readable storage medium of claim 1, wherein said object containing two or more XML schema namespaces is used in conjunction with an alter function which adds schema components to XML schema namespaces within said object containing two or more XML schema namespaces.

7. A computer-implemented method of storing extensible markup language (XML) instances, comprising:
   typing a column of a relational database with a container for XML schema namespaces that contains a plurality of XML schema namespaces;
   storing at least one XML instance in said column of a relational database; and
   validating said at least one XML instance against at least one XML schema represented by said container for XML schema namespaces,
   wherein XML instance comprises a set of XML data conforming to a structure provided by XML schema, XML schema identifies and organizes data in an XML instance, and XML schema namespace is used to ensure unique naming of elements and attributes in an XML schema.

8. The method of claim 7, further including creating said container for XML schema namespaces by specifying the name of said container and said plurality of XML schema namespaces.

9. The method of claim 7, wherein said container for XML schema namespaces is used in conjunction with an import function, modifying said container so that the container refers to schema components in other XML schema namespaces.

10. The method of claim 7, wherein said container for XML schema namespaces is used in conjunction with an include function, allowing assembly of schema components for a single namespace from several schema documents.

11. The method of claim 7, wherein said container for XML schema namespaces is used in conjunction with an alter function, adding schema components to XML schema namespaces within said container for XML schema namespaces.

12. The method of claim 7, further comprising locating a schema that is referred to by an XML schema namespace in the container for XML schema namespaces.

\* \* \* \* \*